UNITED STATES PATENT OFFICE.

DAVID SHIELDS, OF EDGEWORTH, PENNSYLVANIA.

MANUFACTURE OF FERTILIZERS.

1,196,889. Specification of Letters Patent. Patented Sept. 5, 1916.

No Drawing. Application filed March 11, 1916. Serial No. 83,633.

*To all whom it may concern:*

Be it known that I, DAVID SHIELDS, residing at Edgeworth, in the county of Allegheny and State of Pennsylvania, a citizen of the United States, have invented or discovered certain new and useful Improvements in the Manufacture of Fertilizers, of which improvements the following is a specification.

In Letters Patent No. 913,922, granted to me March 2nd, 1909, I described an improvement in the manufacture of fertilizer, consisting, generally stated, in rendering coal or other carbonaceous substance absorbent, and then causing it to absorb mineral salts, or other substances giving it valuable fertilizing qualities. I have very much simplified the manufacture of fertilizing substances having coal as a base, and have improved the fertilizing qualities of the product as well.

According to my present invention I take the coal and grind it as described in my said Letters Patent, bituminous coal being preferably ground to particles which will pass through a sieve which may vary from 8 to 30 meshes to the inch; anthracite coal somewhat finer; and the softer carbonaceous substances such as peat or lignite need not be ground so fine. I mix with the ground coal a solution of mineral salts, which preferably is, or at least is essentially like, the well known subterranean water which flows from oil wells, and which I have found, when subjected to the treatment hereinafter described, does not leave in the resulting fertilizer any substances in such quantity or condition as to be harmful to plant growth. The density of this natural water varies considerably, and the quantity of the water used may vary accordingly. The quantities hereinafter given are those actually used of a natural salt solution of a density of 16° or 17° Baumé. I may use the solution in its natural condition, or I may first boil the water down, the latter being considered preferable.

Taking the natural salt solution, I have found that good results are obtained by mixing about 175 pounds of the water with about 375 pounds of the ground coal. In another case I boiled the salt solution down to one half its original volume, and used 333 pounds of this reduced solution with about 600 pounds of the ground coal. In the latter instance a small quantity of the salts had been precipitated. The mixed mass I then subject to a mild heat for a sufficient period of time to cause the salts to impregnate the coal, leaving the particles of coal in a softened condition. This is advantageously accomplished by placing the mixture of coal and salt water in a closed vessel, and subjecting it to the heat of a warm water bath at a temperature which need not exceed 130° F. This heating may be continued for from 18 to 20 hours, but the temperature to which the mixture is heated, and the period of heating, may be varied within considerable limits. After the mixture has been heated as above described, I mix the impregnated coal with powdered clay. The clay which I prefer to use is a fire clay which is found immediately under deposits of bituminous coal, but other clay may be used with success. It is preferred to mix the impregnated coal and clay together in quantities of about equal weight, though a less percentage of the impregnated coal may be mixed with the clay and desirable fertilizing qualities obtained. The coal and clay mixture is then allowed to lie in mass for a considerable time until it becomes aged or blended, it being only requisite that the mixture shall during this blending period be kept reasonably dry. During this blending period the coal particles become noticeably softer to the touch, so that to the touch the mixture appears homogeneous. There is not only this physical change in the mixture, but it is also believed that there may be a chemical change as well, since without blending the mixture has little fertilizing value and may in many cases actually be harmful to plant growth, whereas after blending it has been found that the mixture is a very valuable fertilizer.

I claim as my invention:

1. The method of manufacturing fertilizer which consists in mixing coal in a finely divided condition with subterranean salt water, subjecting the mixture to heat and causing the salts to impregnate the coal, mixing the impregnated coal with clay in a finely divided condition, and then allowing the final product to age.

2. A fertilizer consisting of an aged mixture of finely divided clay, and coal impregnated with salts derived from subterranean salt water.

3. A fertilizer consisting of an aged mixture of finely divided clay, and coal impregnated with salts derived from subterranean salt water, the quantity of clay in the mixture being at least equal in weight to the quantity of the impregnated coal.

In testimony whereof I have hereunto set my hand.

DAVID SHIELDS.

Witnesses:
MARSHALL A. CHRISTY,
FRANCIS J. TOMASSON.

Copies of this patent may be obtained for five cents each, by addressing the "Commissioner of Patents Washington, D. C."